(12) United States Patent
Akahane et al.

(10) Patent No.: US 10,532,594 B2
(45) Date of Patent: Jan. 14, 2020

(54) RECORDING APPARATUS

(71) Applicant: SEIKO EPSON CORPORATION, Tokyo (JP)

(72) Inventors: Hisayuki Akahane, Matsumoto (JP); Kenichi Shirota, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/203,491

(22) Filed: Nov. 28, 2018

(65) Prior Publication Data
US 2019/0160840 A1 May 30, 2019

(30) Foreign Application Priority Data

Nov. 29, 2017 (JP) ................................. 2017-229578

(51) Int. Cl.
*B41J 29/13* (2006.01)
*H04N 1/00* (2006.01)
*B41J 29/02* (2006.01)
*B41J 2/175* (2006.01)

(52) U.S. Cl.
CPC ............... *B41J 29/13* (2013.01); *B41J 2/175* (2013.01); *B41J 29/02* (2013.01); *H04N 1/00551* (2013.01)

(58) Field of Classification Search
CPC ... B41J 29/13; B41J 2/175; B41J 29/02; B41J 11/00; B41J 2/1752; H04N 1/00551
See application file for complete search history.

(56) References Cited

U.S. PATENT DOCUMENTS

| | | | | |
|---|---|---|---|---|
| 2008/0044197 A1* | 2/2008 | Muraki | ............. | G03G 15/5016 399/81 |
| 2010/0066796 A1* | 3/2010 | Yanagi | ..................... | B41J 29/13 347/108 |
| 2012/0217701 A1 | 8/2012 | Suzuki et al. | | |
| 2015/0002588 A1* | 1/2015 | Hirabayashi | ......... | B41J 2/17503 347/86 |
| 2015/0109396 A1* | 4/2015 | Kawamoto | ............. | B41J 29/02 347/108 |

FOREIGN PATENT DOCUMENTS

JP 2012-179730 A 9/2012

\* cited by examiner

*Primary Examiner* — Henok D Legesse
(74) *Attorney, Agent, or Firm* — Workman Nydegger

(57) ABSTRACT

A recording apparatus includes a recording head, an apparatus main body, a document cover, and a front cover. The apparatus main body houses the recording head therein and has outer surfaces including a document placement surface being an upper surface and a front surface which is adjacent to the document placement surface and which intersects the document placement surface. The document cover is able to be opened/closed in the document placement surface being the upper surface of the apparatus main body. The front cover is able to be opened/closed in the front surface of the apparatus main body. A hand-holding recess used to open the document cover and also used to open the front cover is positioned at part of a portion of the apparatus main body where the document placement surface being the upper surface and the front surface intersect each other.

9 Claims, 10 Drawing Sheets

RECORDING APPARATUS

BACKGROUND

1. Technical Field

The present invention relates to a recording apparatus that performs recording on a medium.

2. Related Art

There have been known recording apparatuses such as printers that include a recording unit that ejects liquid such as ink to a medium such as a sheet of paper so as to perform recording. In some of such recording apparatuses, opening/closing members that can be opened/closed are provided in an upper surface (first surface) and a front surface (second surface) of an apparatus main body that houses the recording unit therein, and these opening/closing members having been closed are opened by being held by a hand of a user. Examples of such recording apparatuses include, for example, a recording apparatus in which an opening/closing member (first opening/closing member) opened/closed in an upper surface (first surface) of an apparatus main body is defined by a medium transport device and an opening/closing member (second opening/closing member) opened/closed in a front surface (second surface) of the apparatus main body is defined by a cover member. This cover member is opened when maintenance is performed in the apparatus main body for, for example, removal of jammed paper (see JP-A-2012-179730).

In the above-described recording apparatus, a panel-shaped operating unit is provided between the medium transport device provided in the upper surface of the apparatus main body and the cover member provided in the front surface of the apparatus main body. Thus, it is required that a hand-holding recess used for a user to open the medium transport device and another hand-holding recess used for the user to open the cover member be independently provided at different positions in the apparatus main body. This makes the external shape of the apparatus complex.

SUMMARY

An advantage of some aspects of the invention is to provide a recording apparatus. This recording apparatus allows a plurality of opening/closing members respectively provided in a plurality of surfaces of an apparatus main body to be easily opened without making an external shape of the apparatus complex.

An apparatus with which the above-described advantage is obtained and effects produced by the apparatus is as follows.

A recording apparatus includes a recording unit, an apparatus main body, a first opening/closing member, and a second opening/closing member. The recording unit ejects liquid to a medium so as to perform recording. The apparatus main body houses the recording unit therein and has outer surfaces including a first surface and a second surface which is adjacent to the first surface and which intersects the first surface. The first opening/closing member provided on the first surface of the apparatus main body so as to be able to be opened/closed. The second opening/closing member provided on the second surface of the apparatus main body so as to be able to be opened/closed. A hand-holding recess used to open the first opening/closing member and also used to open the second opening/closing member is positioned at part of a portion of the apparatus main body where the first surface and the second surface intersect each other.

With this structure, the user inserts his/her fingertips into the hand-holding recess when holding with his/her hand the first opening/closing member to open the first opening/closing member and inserts his/her fingertips into the same hand-holding recess also when holding with his/her hand the second opening/closing member to open the second opening/closing member. That is, it is not necessary to provide a plurality of hand-holding recesses separately at a plurality of positions in the outer surfaces of the apparatus main body. Thus, a plurality of opening/closing members provided in a plurality of surfaces of the apparatus main body can be easily opened without making the external shape of the apparatus main body complex.

In the recording apparatus, it is preferable that the first surface be an upper surface of the apparatus main body when the recording apparatus is installed in a usable state, the second surface be a front surface serving as a front surface of the apparatus main body, and the recess be provided adjacent to an operating unit that is provided in an upper front portion of the apparatus main body and that is used to operate the recording apparatus.

With this structure, the hand-holding recess to be used to open the first opening/closing member and also used to open the second opening/closing member and the operating unit to be operated by the user are adjacent to each other in the upper front portion of the apparatus main body. This increases ease of operation.

In the recording apparatus, it is preferable that, in the front surface of the apparatus main body, a liquid containing unit that is able to contain the liquid be provided adjacent to the recess.

In the recording apparatus, it is preferable that the liquid containing unit allow the liquid to be poured thereinto from an outside thereof.

With this structure, the liquid can be poured into the liquid containing unit on the front surface side at the front of the apparatus main body. This improves work efficiency.

In the recording apparatus, it is preferable that the liquid containing unit be provided with a third opening/closing member that is, by being operated by a user who holds with his/her hand the third opening/closing member, able to be opened so as to open the liquid containing unit at a top of the liquid containing unit and able to be closed so as to cover the liquid containing unit from above.

With this structure, for example, in order to pour the liquid from the outside into the liquid containing unit, operation to open the closed third opening/closing member can be performed on the front surface side at the front of the apparatus main body. Thus, also in this regard, ease of operation is increased.

In the recording apparatus, it is preferable that the third opening/closing member having been closed so as to cover the liquid containing unit from above be, by being held by a hand by using the recess positioned in the upper front portion of the apparatus main body, pivoted forward so as to be opened to open the liquid containing unit at the top of the liquid containing unit.

With this structure, the user can insert his/her fingertips into the hand-holding recess when holding with his/her hand the first opening/closing member to open the first opening/closing member and the second opening/closing member to open the second opening/closing member and insert his/her fingertips into the same hand-holding recess also when holding with his/her hand the third opening/closing member to open the third opening/closing member.

In the recording apparatus, it is preferable that the liquid containing unit project further forward than the second opening/closing member.

With this structure, part of a space occupied by the liquid containing unit can be provided outside the apparatus main body. Thus, the size of the apparatus main body can be reduced while the capacity of the liquid containing unit can be increased.

In the recording apparatus, it is preferable that, when the second opening/closing member is opened in the second surface, the second opening/closing member be able to be held in a first open state and able to be held in a second open state in which the second opening/closing member is open at a larger opening angle than an opening angle at which the second opening/closing member is open in the first open state.

With this structure, for example, when maintenance is performed in the apparatus main body while the second opening/closing member is open, the maintenance may be obstructed with the second opening/closing member set in the first open state. In this case, when the second opening/closing member is set in the second open state in which the second opening/closing member is open at the larger opening angle than that in the first open state, ease of the maintenance is increased.

In the recording apparatus, it is preferable that a stacker that allows the medium output from an inside of the apparatus main body to be placed thereon be disposed below the second opening/closing member on a front surface side of the apparatus main body, and the second opening/closing member be brought into contact with the stacker from above so as to be held in the second open state.

With this structure, opening of the second opening/closing member from the second open state to the state where the second opening/closing member is open at a larger opening angle than that in the second open state can be regulated by the stacker that is to be brought into contact with the second opening/closing member from below. This can reduce the likelihood of the second opening/closing member being largely opened so as to hit other members.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of a recording apparatus will be described below with reference to the drawings.

Figure 1:
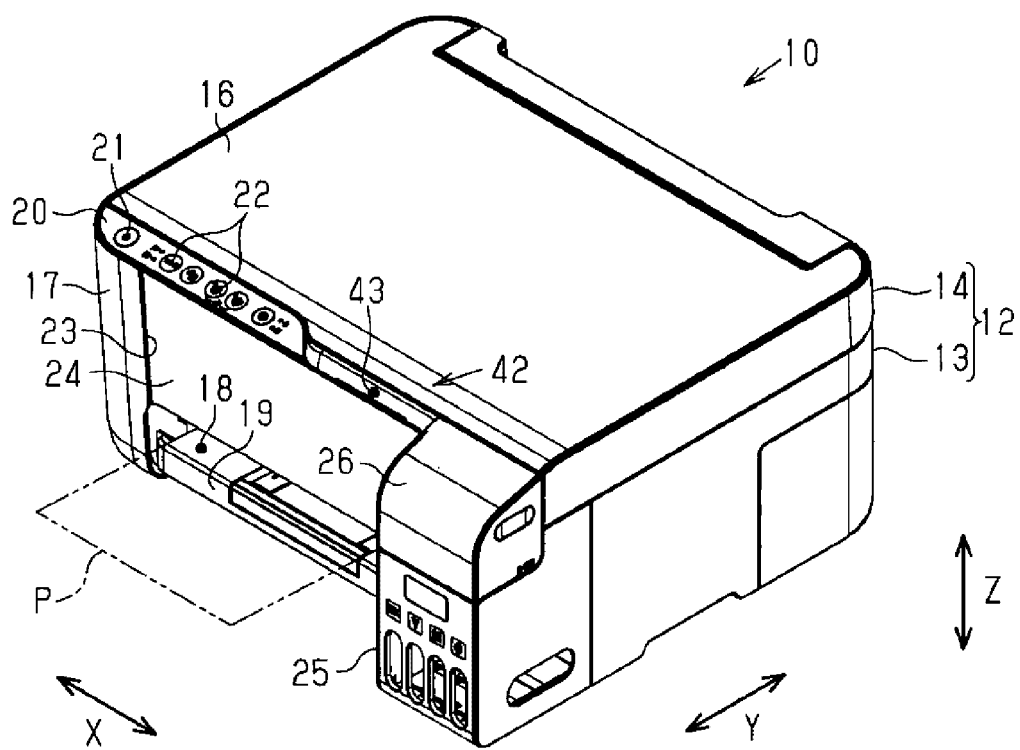
FIG. 1 is a perspective view of a recording apparatus according to an embodiment.

As illustrated in FIG. 1, a recording apparatus 10 according to an embodiment is an ink jet printer that ejects ink serving as liquid to a medium P such as, for example, a sheet of paper so as to perform recording. The recording apparatus 10 includes a substantially rectangular parallelepiped-shaped apparatus main body 12 that has specified lengths as a height, a depth, and width in a state in which the apparatus main body 12 is installed at a horizontal site of use. Referring to FIG. 1, on the assumption that the recording apparatus 10 is disposed on a horizontal plane, the vertical direction is represented by the Z axis, and directions along a horizontal plane perpendicular to the vertical direction are represented by the X axis and the Y axis. In the following description, a direction along the X axis is referred to as the width direction and a direction along the Y axis is referred to as the depth direction. The width direction, the depth direction, and the vertical direction intersect (preferably, perpendicularly intersect) one another.

Figure 2:
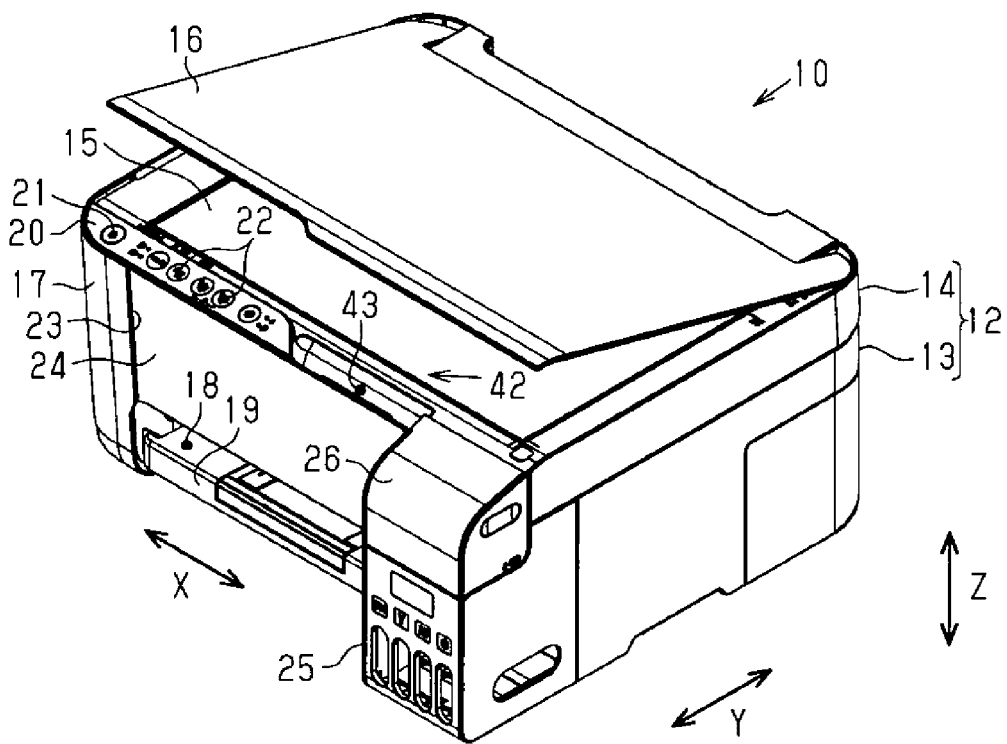
FIG. 2 is a perspective view of the recording apparatus with a document cover opened.

As illustrated in FIGS. 1 and 2, the apparatus main body 12 includes a substantially rectangular parallelepiped-shaped housing 13 and a document reader 14 disposed on the housing 13. The document reader 14 includes a horizontal document placement surface 15 and a document cover 16. The document placement surface 15 is formed of transparent glass or the like. A document to be read is placed on the document placement surface 15. The document cover 16 can cover the document placement surface 15. The document cover 16 can be, about the X axis along the width direction as a pivot, closed so as to cover the document placement surface 15 from above (state illustrated in FIG. 1) and opened from the closed state so as to open a region above the document placement surface 15 (state illustrated in FIG. 2). In this case, the document placement surface 15 of the document reader 14 defines an upper surface (first surface) facing upward in the vertical direction out of a plurality of (six in this case) outer surfaces of the apparatus main body 12. Such a document cover 16 corresponds to a first opening/closing member that is opened/closed in the document placement surface 15 serving as an example of the upper surface (first surface) of the apparatus main body 12.

Figure 3:
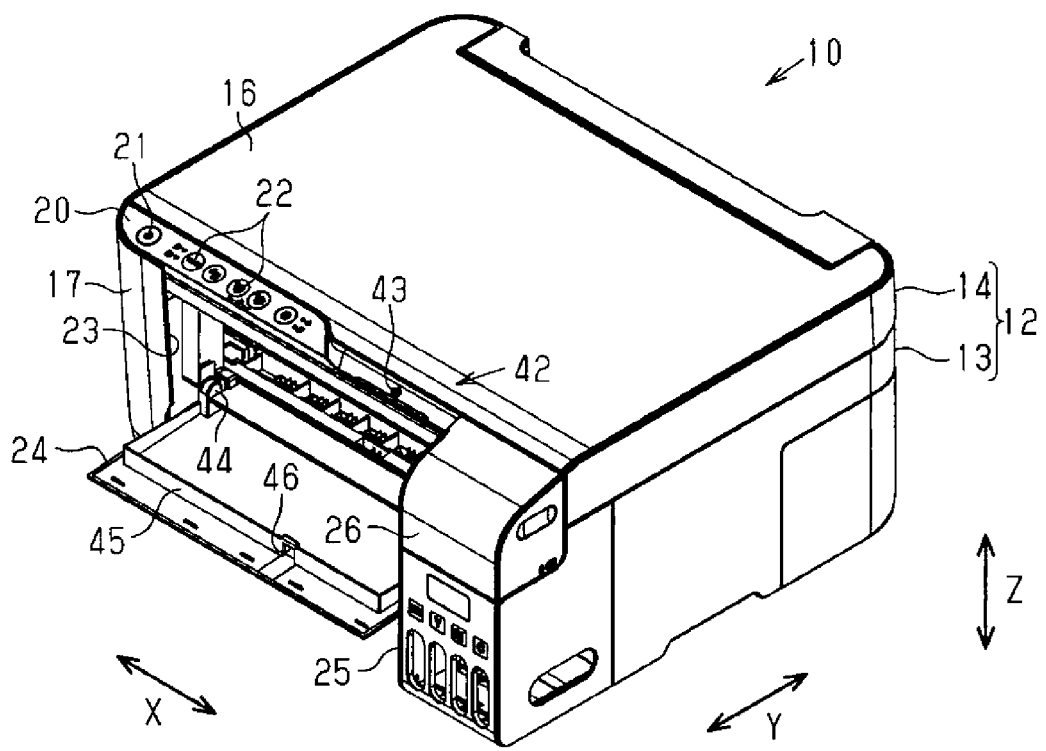
FIG. 3 is a perspective view of the recording apparatus with a front cover opened.

As illustrated in FIGS. 1 and 3, an output opening 18 through which the medium P is output from the inside is provided in a lower portion of a front surface 17 serving as a front surface of the apparatus main body 12 in the outer surfaces of the housing 13. A stacker 19 is provided in the output opening 18. The medium P forwardly output from the housing 13 in the depth direction along the Y axis is set in a placement state and supported by the stacker 19. Furthermore, an operating unit 20 is provided in an upper portion of the front surface 17 of the housing 13. The operating unit 20 is operated by a user of the recording apparatus 10. The operating unit 20 is a widthwise elongated panel the longitudinal direction of which is the width direction along the X axis. The operating unit 20 is provided with a power button 21 to be operated when the recording apparatus 10 is turned on/off and operating buttons 22 to be operated when various types of operating information are input.

An opening 23 is provided between the output opening 18 and the operating unit 20 in the vertical direction along the Z axis in the front surface 17 of the housing 13 of the apparatus main body 12. The opening 23 has a rectangular shape, and the length of the opening 23 in the width direction along the X axis is substantially the same as that of the output opening 18. A front cover 24 is provided in the front surface 17 of the housing 13. The front cover 24 has a rectangular front shape that is substantially the same as that of the opening 23. The front cover 24 is opened/closed about the X axis along the width direction as a pivot so as to expose the inside of the housing 13 through the opening 23 (state illustrated in FIG. 3) and so as to close the opening 23 (state illustrated in FIG. 1). When the front cover 24 is open as illustrated in FIG. 3, the user can enter his/her hand into the housing 13 through the opening 23 for, for example, maintenance.

Here, the front surface 17 of the housing 13 is a surface perpendicular to the document placement surface 15 of the document reader 14 and is bent downward from a front end of the document placement surface 15. The document placement surface 15 defines the upper surface (first surface) out of the outer surfaces of the apparatus main body 12. In this regard, the front surface 17 defines, out of the outer surfaces of the apparatus main body 12, a second surface adjacent to and intersecting the upper surface (first surface). Furthermore, the front cover 24 corresponds to a second opening/closing member that is opened/closed in the front surface 17 of the housing 13 serving as an example of a front surface (second surface) of the apparatus main body 12. The closed front cover 24 as illustrated in FIG. 1 is opened as illustrated in FIG. 3 when an upper end portion thereof is pivoted forward about a lower end portion thereof as a pivot.

Figure 4:
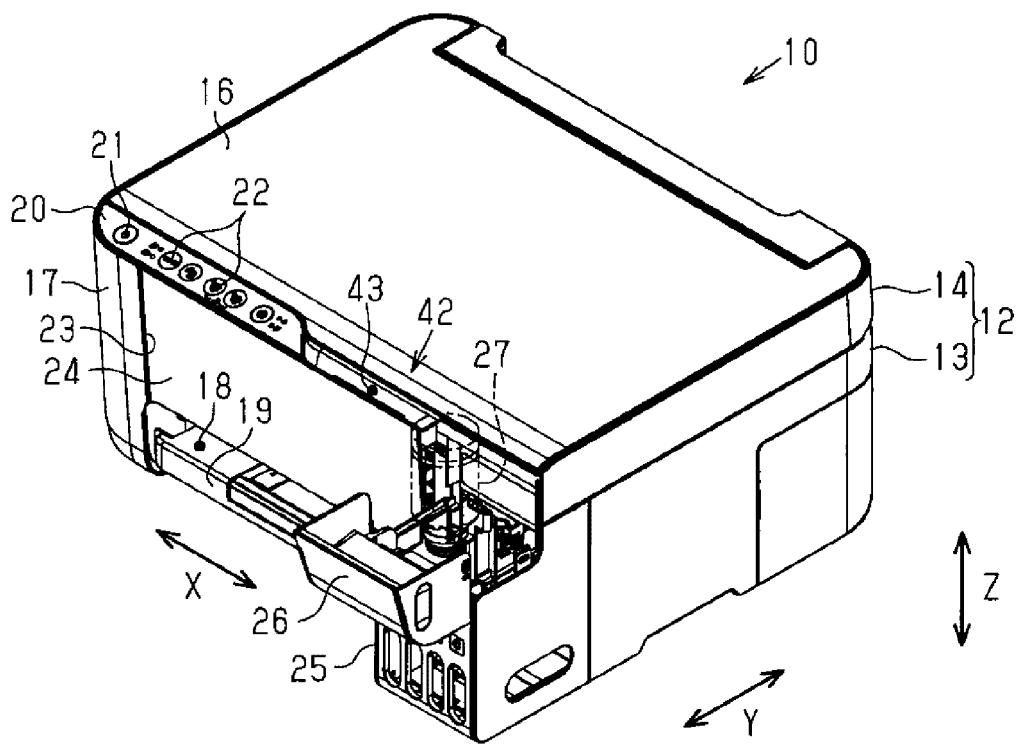
FIG. 4 is a perspective view of the recording apparatus with a tank cover opened.

As illustrated in FIGS. 1 and 4, a liquid containing unit 25 that can contain liquid such as ink is provided adjacent to the front cover 24 in the width direction in the front surface 17 of the housing 13 of the apparatus main body 12. The liquid containing unit 25 is in the form of a tank. That is, the liquid containing unit 25 is provided adjacent to the front cover 24 on one side (right side in FIGS. 1 and 4) in the width direction relative to the front cover 24 when the recording apparatus 10 is seen from front. In this case, the liquid containing unit 25 projects further to the front being the front side in the depth direction than the front cover 24 in the front surface 17 of the housing 13. That is, the liquid containing unit 25 ensures a space for containing the liquid in a region outside the housing 13 included in the apparatus main body 12.

Furthermore, the liquid containing unit 25 is provided with a tank cover 26 that can be opened/closed, by being operated by the user who holds with his/her hand the tank cover 26, about the X axis along the width direction as a pivot so as to open the liquid containing unit 25 at the top (state illustrated in FIG. 4) and so as to cover the liquid containing unit 25 from above (state illustrated in FIG. 1). That is, the closed tank cover 26 as illustrated in FIG. 1 is opened as illustrated in FIG. 4 when a rear end portion thereof is pivoted forward about a lower portion thereof on the front side as a pivot. In this regard, the tank cover 26 corresponds to a third opening/closing member that can be opened/closed, by being operated by the user who holds with his/her hand the tank cover 26, so as to open the liquid containing unit 25 at the top and so as to cover the liquid containing unit 25 from above. When the tank cover 26 is open, as indicated by a two-dot chain line in FIG. 4, the liquid containing unit 25 can be replenished with the liquid by inserting a liquid bottle 27 for replenishment into a filling port (not illustrated).

Figure 5:
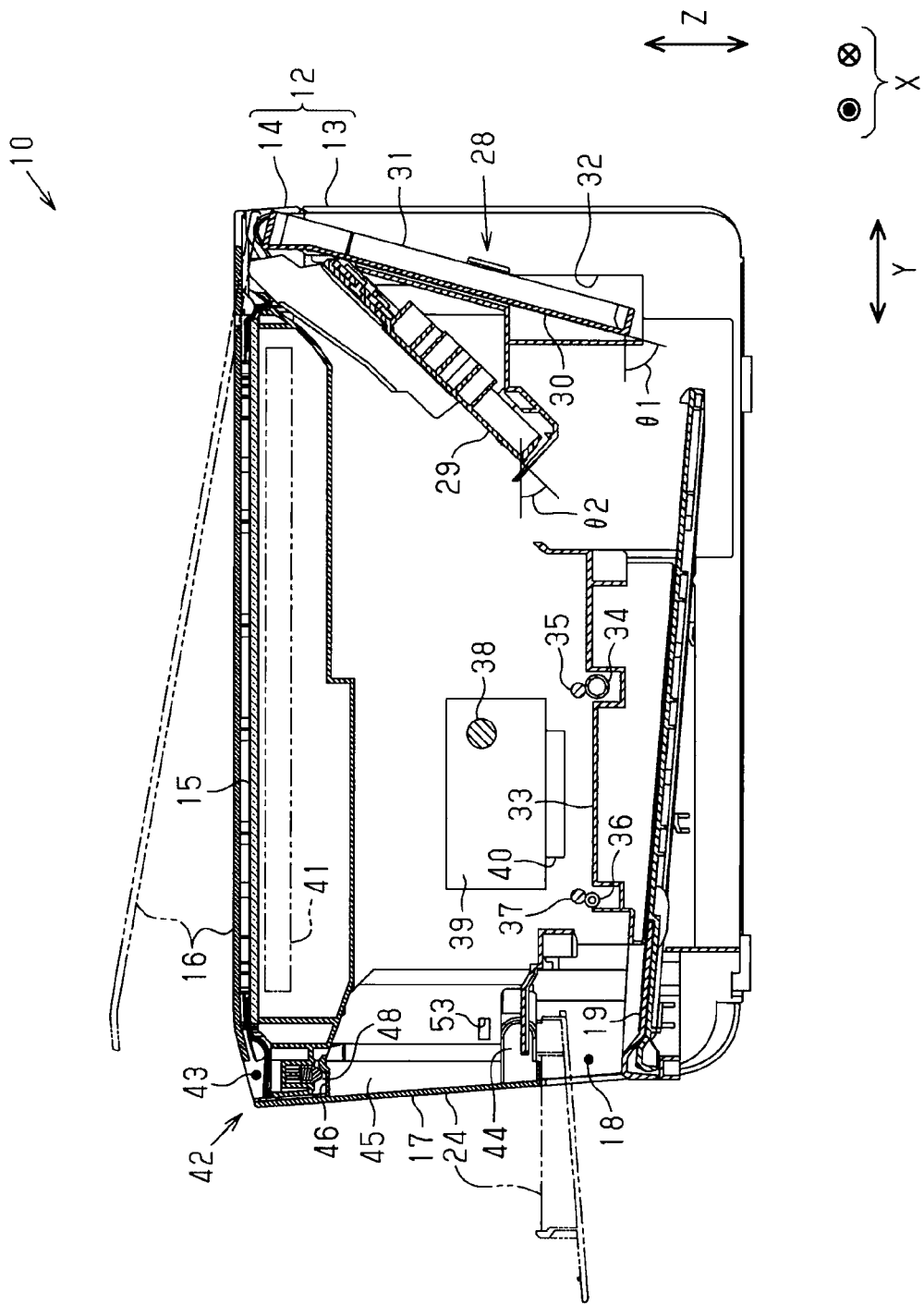
FIG. 5 is a side sectional view schematically illustrating an inner structure of the recording apparatus.
Figure 6:
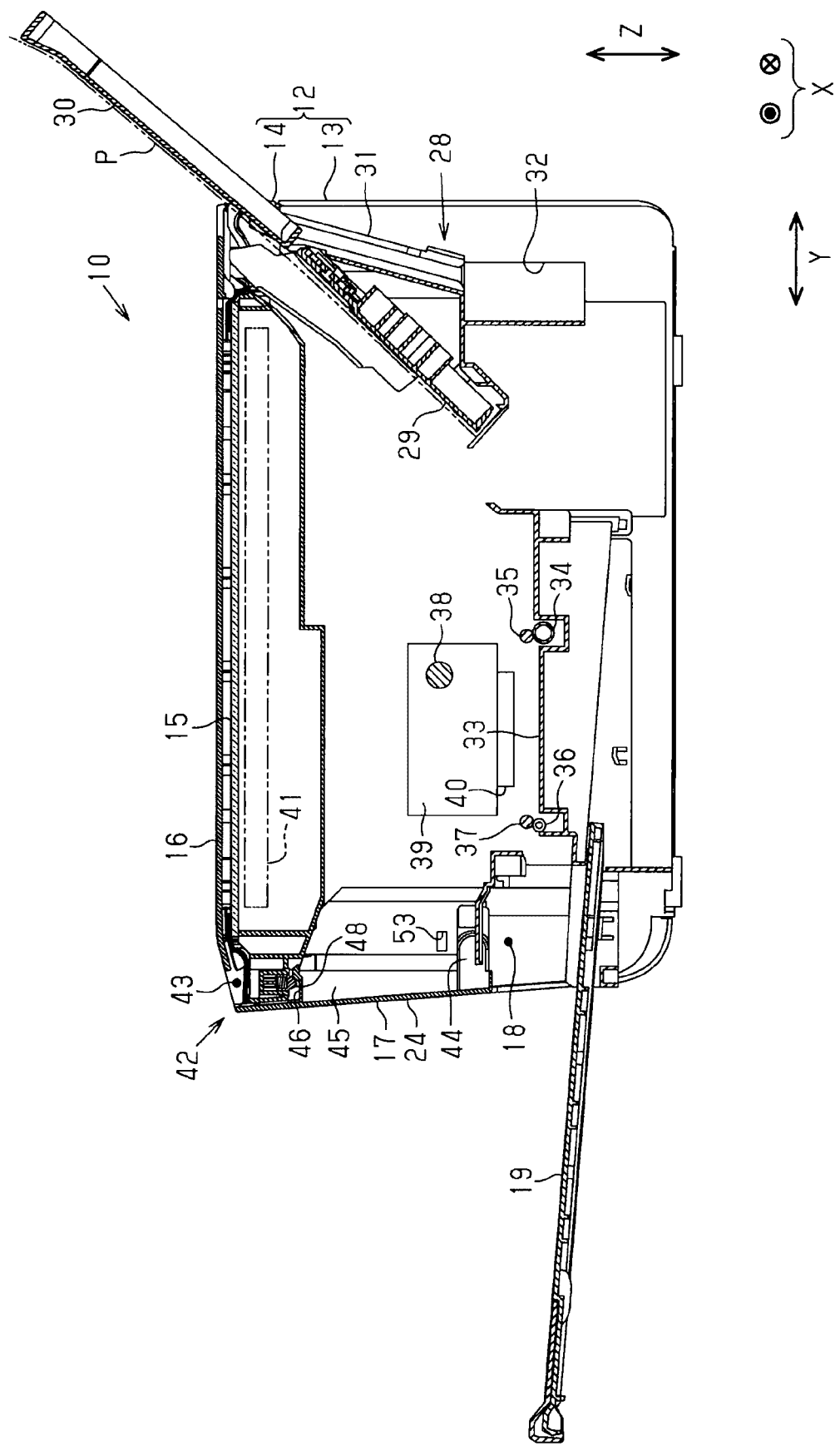
FIG. 6 is a side sectional view schematically illustrating the recording apparatus in use.

As illustrated in FIGS. 5 and 6, the recording apparatus 10 includes a medium feeding unit 28 on the rear side of the housing 13 included in the apparatus main body 12. The medium feeding unit 28 includes a medium placement portion 29 and a plate-shaped auxiliary placement portion 30. The medium placement portion 29 inclines the medium P and allows the inclined medium P to be placed thereon at a position facing a feeding roller (not illustrated). As illustrated in FIG. 6, the auxiliary placement portion 30 is, in use, positioned on a line passing through the medium placement portion 29 so as to support the placement state of the medium P placed on the medium placement portion 29. Furthermore, the medium feeding unit 28 is provided with a support guide 31 and a pocket portion 32. The support guide 31 inclines the auxiliary placement portion 30 such that a lower end portion of the auxiliary placement portion 30 is positioned in front of an upper end portion of the auxiliary placement portion 30 in the depth direction along the Y axis and can supports the inclined auxiliary placement portion 30. The pocket portion 32 allows a portion of the auxiliary placement portion 30 supported in the inclined position by the support guide 31 below a middle position in the up-down direction to be inserted thereinto from above so as to be contained therein.

When the lower end portion of the auxiliary placement portion 30 is contained in the pocket portion 32 and supported by the support guide 31 in the inclined position (state illustrated in FIG. 5), an inclination angle θ1 by which the support guide 31 is inclined relative to the Y axis along the depth direction (horizontal direction) is larger than an inclination angle θ2 by which the medium placement portion 29 is inclined relative to the Y axis along the depth direction (horizontal direction). As illustrated in FIG. 6, in use, the auxiliary placement portion 30 is pulled up diagonally rearward from the pocket portion 32 and moved out of the support guide 31. This allows the auxiliary placement portion 30 to be inclined rearward. When the auxiliary placement portion 30 is disposed on the line passing through the medium placement portion 29, the auxiliary placement portion 30 is brought into contact with an angled contact member (not illustrated). Thus, the auxiliary placement portion 30 is inclined so that the auxiliary placement portion 30 can support the placement state of the medium P placed on the medium placement portion 29.

Furthermore, in the housing 13, a support table 33 is provided at a position that is in front of a lower end portion of the medium placement portion 29 in the depth direction along the Y axis and below the lower end portion of the medium placement portion 29 in the vertically direction along the Z axis. The support table 33 can support the medium P fed from the medium feeding unit 28 by setting the medium P in the horizontal position. A transport drive roller 34 and a transport driven roller 35 are provided at positions closer to the medium feeding unit 28 than the support table 33 in the depth direction along the Y axis. The transport drive roller 34 and the transport driven roller 35 are rotated while pinching the medium P therebetween so as to transport the medium P toward the output opening 18 downstream thereof. Meanwhile, an output drive roller 36 and an output driven roller 37 are provided at positions closer to the output opening 18 than the support table 33 in the depth direction along the Y axis. The output drive roller 36 and the output driven roller 37 are rotated while pinching the medium P therebetween so as to output the medium P to the outside of the housing 13 through the output opening 18.

Furthermore, in the housing 13, a guide shaft 38 having a shaft shape is provided above the support table 33 so as to extend along the X axis. A carriage 39 is supported by the guide shaft 38 such that the carriage 39 can reciprocated in the width direction along the X axis. A recording head 40 is mounted on a lower surface side of the carriage 39. The recording head 40 serves as an example of a recording unit and performs recording on the recording medium P by ejecting the liquid to the medium P transported to the downstream side in a transport direction while being supported on the support table 33. During use in which recording is performed by ejecting the liquid from the recording head 40 to the medium P, as illustrated in FIG. 6, the stacker 19 is pulled forward from the housing 13 so as to hold the medium P output from the output opening 18 by setting the medium P in the placement state.

As illustrated in FIGS. 5 and 6, an image scanner 41 is provided in the document reader 14. An image of the document on the document placement surface 15 can be read by the image scanner 41 while the image scanner 41 is being moved in a direction along the X axis. That is, after the document cover 16 is closed, the document reader 14 reads, by using the image scanner 41, the image of the document placed on the document placement surface 15 while the document cover 16 is open. As indicated by a two-dot chain line illustrated in FIG. 5, the document cover 16 is opened/closed about a rear end portion as a pivot being an end portion thereof on the rear side in the depth direction along the Y axis. That is, the document cover 16 is operated so as to be opened/closed by the user who holds with his/her hand a front end portion being an end portion of the document cover 16 on the front side in the depth direction along the Y axis. For this purpose, in the apparatus main body 12, a hand-holding recess 43 is provided at a corner portion 42 in an upper front portion where the front surface 17 of the housing 13 intersects the document placement surface 15 and where the front end portion of the document cover 16 is disposed. The hand-holding recess 43 allows fingertips of the user to be inserted thereinto when the user holds the front end portion of the closed document cover 16. As illustrated in FIGS. 1 to 4, the recess 43 is adjacent to the operating unit 20 and the liquid containing unit 25 in the width direction in the upper front portion of the apparatus main body 12.

Meanwhile, the front cover 24 to be opened/closed in the front surface 17 of the housing 13 is, as described above, opened when the upper end portion thereof is pivoted forward about the lower end portion thereof as the pivot. Thus, as illustrated in, for example, FIG. 5, hinge portions 44 defining the pivot is provided behind the lower end portion. In order to open the closed front cover 24, the user holds with his/her hand the end portion (upper end portion in FIG. 5) of the front cover 24 opposite to the end portion of the front cover 24 provided with the hinge portions 44 so as to open the front cover 24 forward in the depth direction. In so doing, the fingertips of the user are inserted into the hand-holding recess 43 positioned at the corner portion 42 in the upper front portion of the apparatus main body 12. That is, the hand-holding recess 43 into which the user inserts his/her fingertips when opening the document cover 16 is also used as the hand-holding recess 43 when opening the front cover 24.

Figure 7:
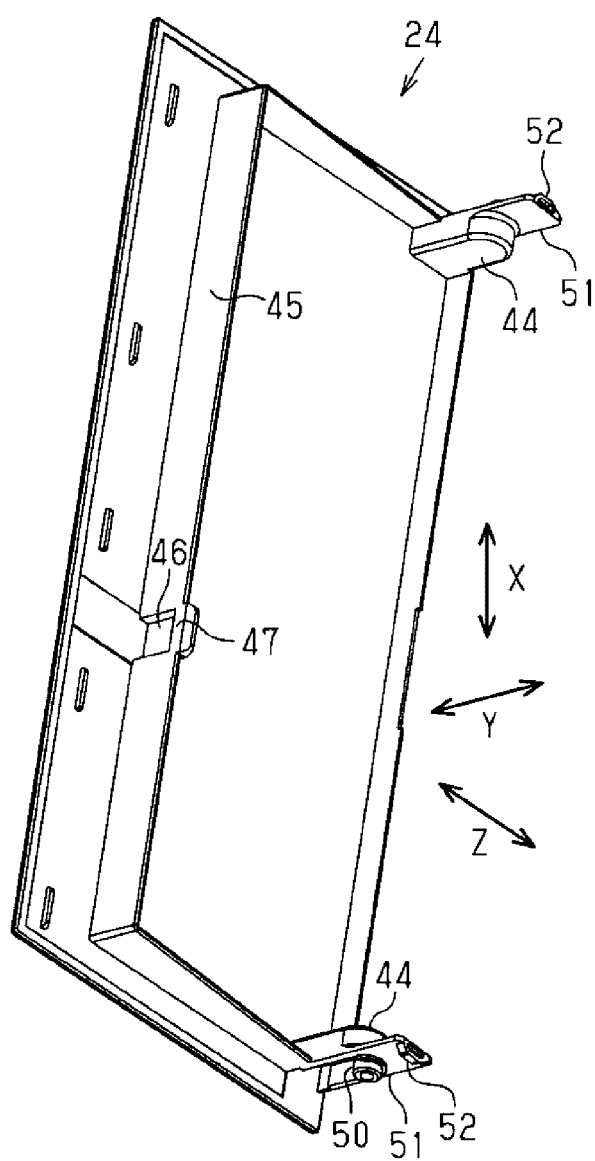
FIG. 7 is a perspective view of the front cover when seen from a rear side.
Figure 8:
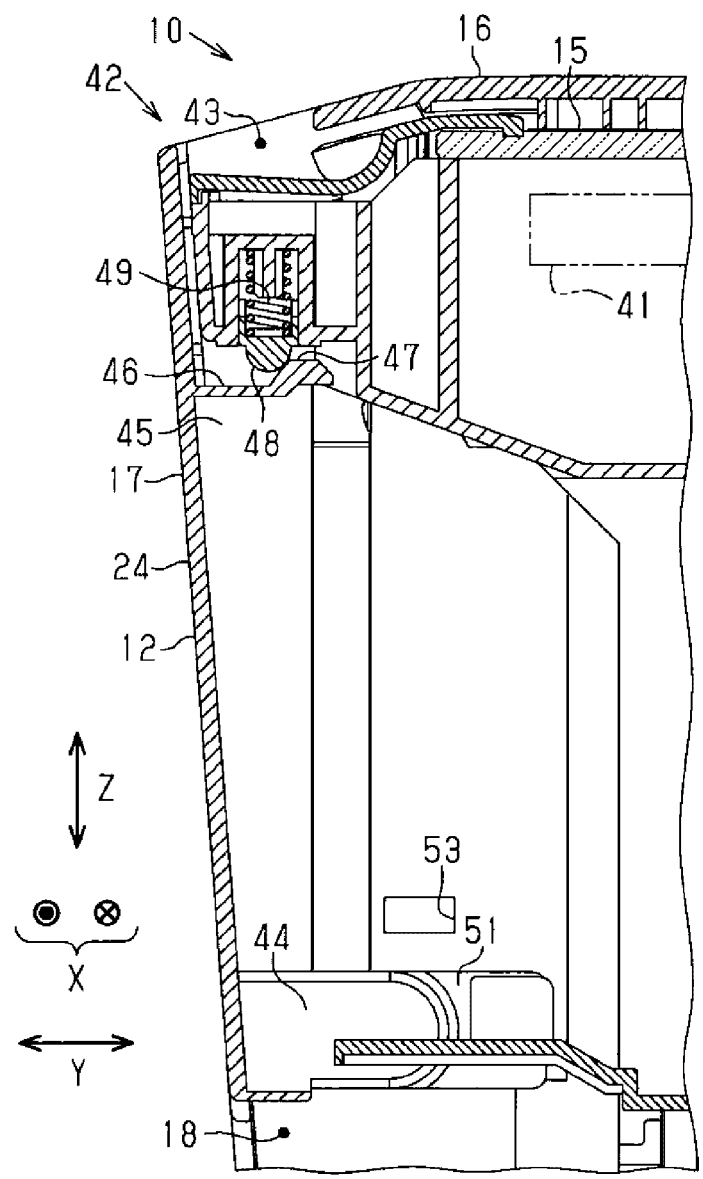
FIG. 8 is a side sectional view schematically illustrating a corner portion where a front surface and an upper surface of the recording apparatus intersect each other.

As illustrated in FIGS. 7 and 8, the front cover 24 is a rectangular plate member and has a rectangular frame-shaped reinforcing rib 45 on a rear side thereof. The rectangular frame-shaped rib 45 has a depression 46 in the middle of a longitudinally extending portion on the opposite side of the front cover 24, in a short side direction of the front cover 24, to the portion provided with the hinge portions 44 serving as the pivot, that is, a horizontally extending portion positioned on an upper portion in the vertical direction when the front cover 24 is closed as illustrated in FIG. 8. Furthermore, as illustrated in FIG. 8, a mound portion 47 having a trapezoidal sectional shape is formed at part of an edge portion of the depression 46 on the distal end portion of the rib 45 projecting from the rear surface of the front cover 24. Meanwhile, in the apparatus main body 12, a downwardly convex lock member 48 urged downward by a coil spring 49 is provided at a position that is immediately above the depression 46 when the front cover 24 is closed as illustrated in FIG. 8. Thus, when the front cover 24 is closed as illustrated in FIG. 8, elastic engagement of the lock member 48 with the depression 46 regulates opening of the front cover 24 and maintains the closed state of the front cover 24. When the closed front cover 24 is opened, the lock member 48 is moved from the inside to the outside of the depression 46 through the mound portion 47 resisting the urging force of the coil spring 49.

Referring back to FIG. 7, the hinge portions 44 provided so as to form a pair in the width direction along the X axis on the rear side of the front cover 24 each have a corresponding one of cylindrical shaft portions 50 projecting outward in the width direction. That is, the front cover 24 is pivoted about the shaft portions 50 as the pivot when the shaft portions 50 are supported by bearings (not illustrated) provided in the apparatus main body 12. Furthermore, the hinge portions 44 each have an arm portion 51 extending in a direction separating from the rear surface of the front cover 24 with the shaft portion 50 interposed therebetween, and an engagement projection 52 that rises in a direction in which the shaft portion 50 projects is provided at a distal end portion of the arm portion 51. The arm portions 51 are bendable and bent when, as the front cover 24 is opened/closed, the engagement projections 52 are brought into engagement with or brought out of engagement from engagement holes 53 and engagement holes 54 (see FIG. 10) for positioning provided on the apparatus main body 12 side.

Next, operation of the recording apparatus 10 according to the present embodiment structured as above is described.

In order to set the recording apparatus 10 in a use state in which the liquid is ejected from the recording head 40 to the medium P so as to perform recording, the auxiliary placement portion 30 of the medium feeding unit 28 is pulled from the pocket portion 32 on the rear side of the apparatus main body 12 so that a state of the auxiliary placement portion 30 is changed from a state illustrated in FIG. 5 to a state illustrated in FIG. 6, thereby the auxiliary placement portion 30 is set in an inclined state in which the auxiliary placement portion 30 is positioned on the line that passes through the medium placement portion 29. In this case, in the state illustrated in FIG. 5, the auxiliary placement portion 30 is inserted into the pocket portion 32 while assuming an inclined state in which the lower end portion is positioned in front of the upper end portion in the depth direction in the auxiliary placement portion 30. Thus, compared to the case where the auxiliary placement portion 30 is contained in the pocket portion 32 while the auxiliary placement portion 30 is perpendicularly directed downward in the vertical direction from a position near an upper end of the medium placement portion 29, a space for containing the auxiliary placement portion 30 (in this case, the volume of the pocket portion 32) on the rear side of the apparatus main body 12 can be reduced.

Meanwhile, on the front surface side of the apparatus main body 12, the stacker 19 is largely pulled forward so that a state of the stacker 19 is changed from a state illustrated in FIG. 5 to a state illustrated in FIG. 6. Thus, the medium P output from the output opening 18 above the stacker 19 can be placed on the stacker 19. In the state illustrated in FIG. 6, when the liquid is ejected from the recording head 40 along with reciprocation of the carriage 39 to the medium P having been fed from the medium feeding unit 28 and transported onto the support table 33, an image including, for example, characters is recorded on the medium P.

Here, while the medium P is being transported on the support table 33 from the medium feeding unit 28 side on the upstream side toward the output opening 18 side on the downstream side in the transport direction, jamming of the medium P may occur due to some cause during the transportation. It is preferable that such jamming of the medium P be quickly eliminated. Thus, when such jamming of the medium P occurs in the apparatus main body 12, the front cover 24 provided in the front surface 17 of the housing 13 of the apparatus main body 12 is opened by the user.

Figure 9:
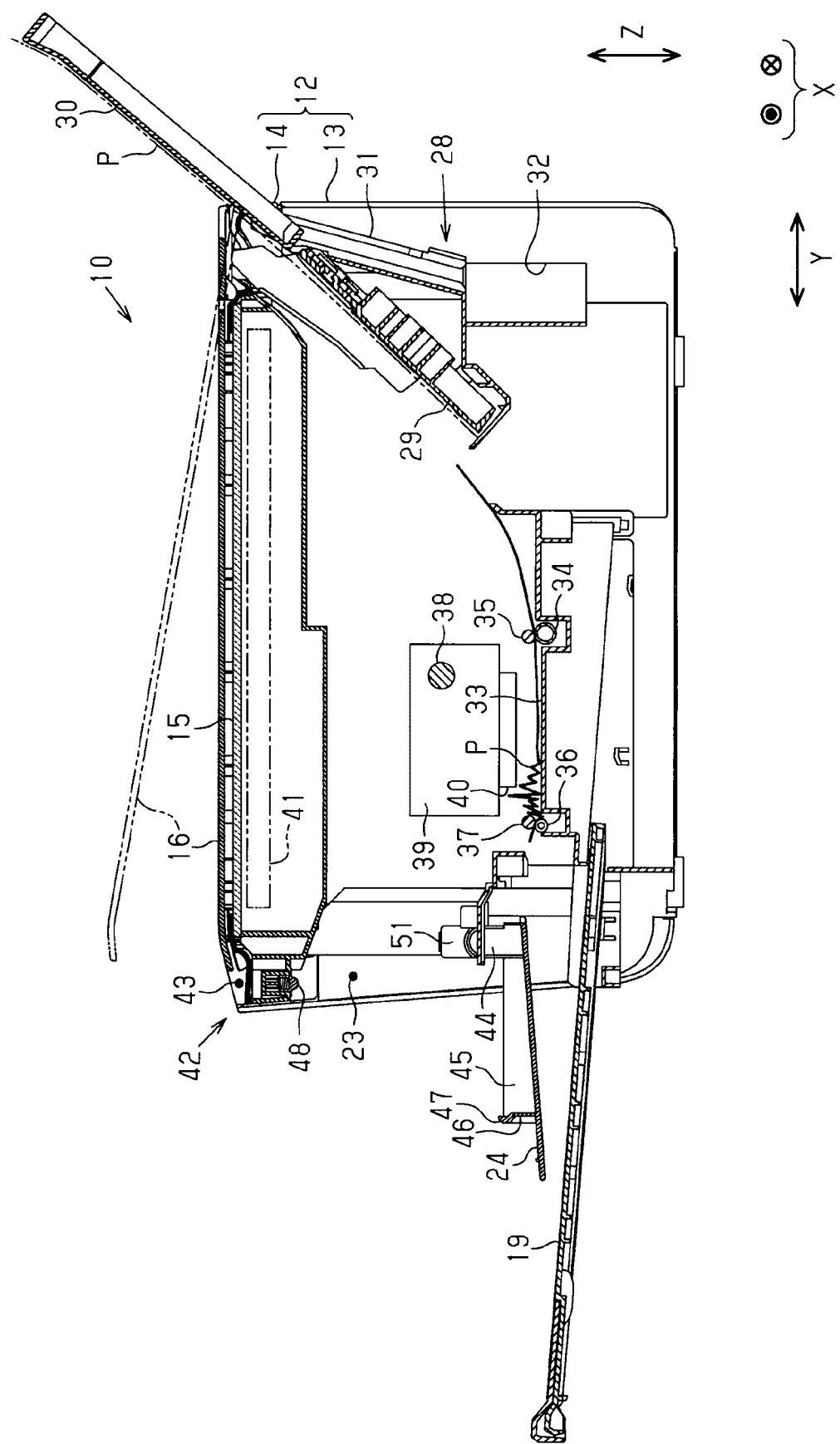
FIG. 9 is a side sectional view schematically illustrating the recording apparatus in use with the front cover opened.

That is, as illustrated in FIG. 9, the close front cover 24 illustrated in FIG. 6 is opened as illustrated in FIG. 9 about the hinge portions 44 disposed on the lower end portion of the front cover 24 as the pivot. In this case, the fingertips of the user are inserted into the hand-holding recess 43 provided at the corner portion 42 in the upper front portion of the apparatus main body 12, and the front cover 24 is opened such that the upper portion of the front cover 24 held by the user's hand at the position of the recess 43 is moved counterclockwise in FIG. 9. As a result, the inside of the housing 13 of the apparatus main body 12 becomes visible through the opening 23. Thus, the user can insert his/her hand through the opening 23 so as to remove the medium P wrinkled and jammed near the support table 33.

Figure 10:
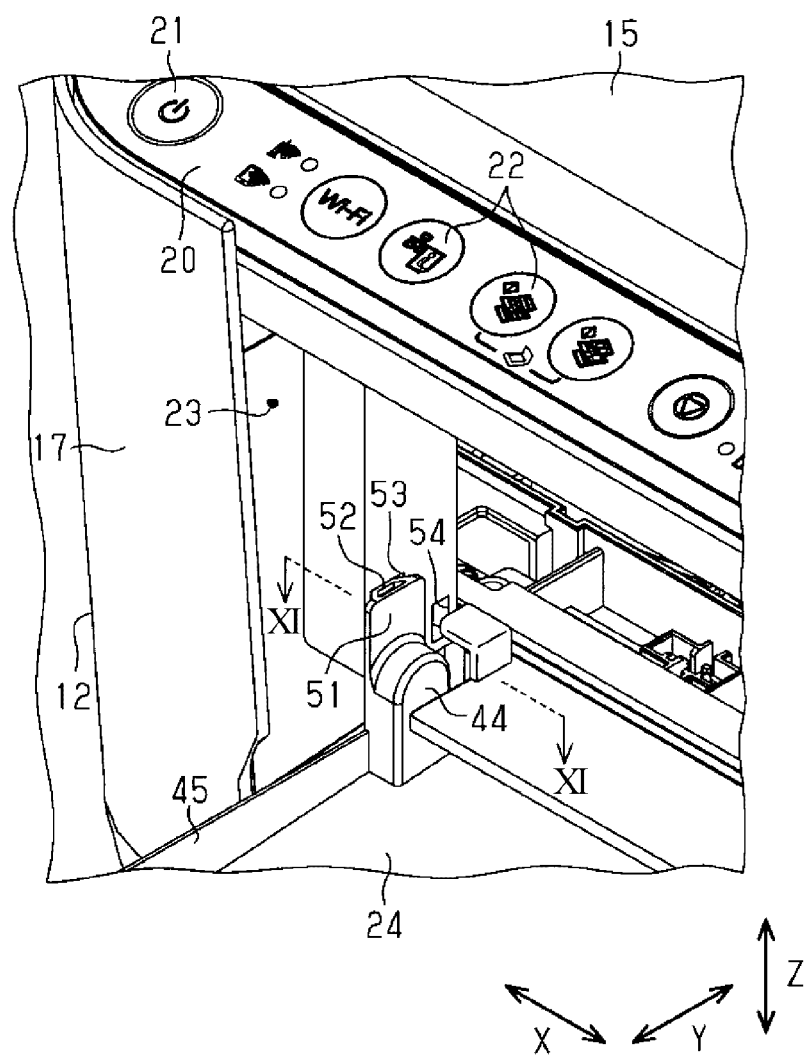
FIG. 10 is a perspective view of part of the recording apparatus with the front cover opened.

As illustrated in FIG. 10, when the closed front cover 24 is opened, the engagement projections 52 provided at the distal end portions of the arm portions 51 of the hinge portions 44 are engaged with the engagement holes 53 for holding the open state. That is, the engagement projections 52 engaged with the engagement holes 54 for holding the closed state when the front cover 24 is closed are brought out of engagement from the engagement holes 54 and brought into engagement with the engagement holes 53 for holding the open state due to a shake occurring along with bending of the arm portions 51 while the front cover 24 is being opened. Thus, engagement of the engagement projections 52 with the engagement holes 53 for holding the open state holds the front cover 24 in a first open state in which an opening angle at which the front cover 24 is open is substantially a right angle as illustrated in FIG. 9.

Figure 11:
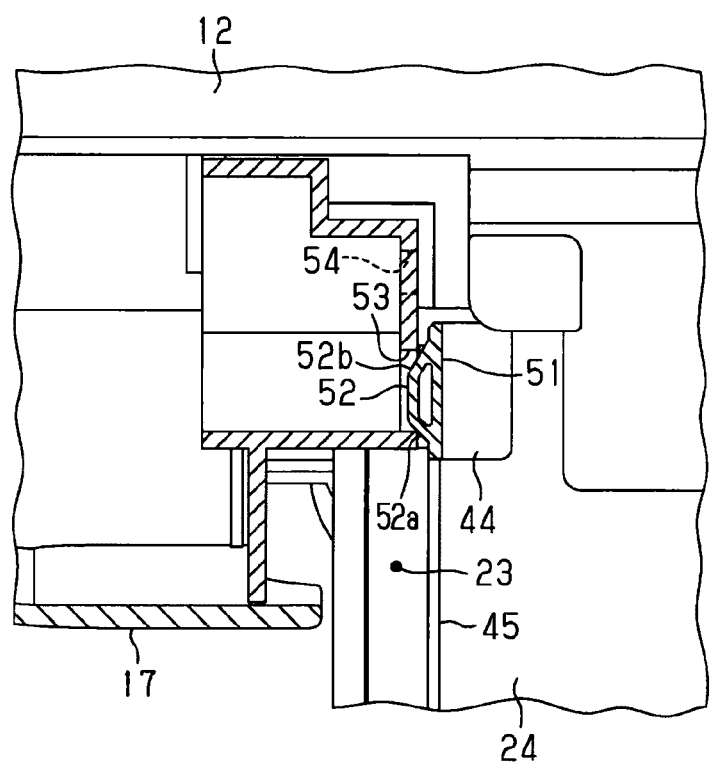
FIG. 11 is a sectional view taken along line XI-XI illustrated in FIG. 10.
Figure 11:
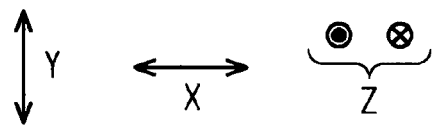

As illustrated in FIG. 11, the engagement projections 52 have an inequilateral trapezoidal sectional shape. That is, an inclination angle at which inclined surfaces 52a on the opening side in the opening/closing of the front cover 24 are inclined is larger than an inclination angle at which inclined surfaces 52b on the closing side are inclined. When the front cover 24 is pivoted in a direction in which the front cover 24 in the first open state illustrated in FIGS. 10 and 11 is closed, the inclined surfaces 52b on the closing side inclined at a relatively small angle slide against opening edges of the engagement holes 53, thereby bending the arm portions 51. Thus, an operating force in the closing direction can be small. In contrast, when the front cover 24 is pivoted in a direction in which the opening angle of the front cover 24 increases from that of the first open state illustrated in FIGS. 10 and 11, the inclined surfaces 52a on the opening side inclined at a relatively large angle slide against opening edges of the engagement holes 53, thereby bending the arm portions 51. Thus, a large operating force is required in the opening direction. That is, this can suppress further opening of the front cover 24 to hit, for example, an installation surface of the recording apparatus 10 when something inadvertently hits the front cover 24 in the first open state.

Figure 12:
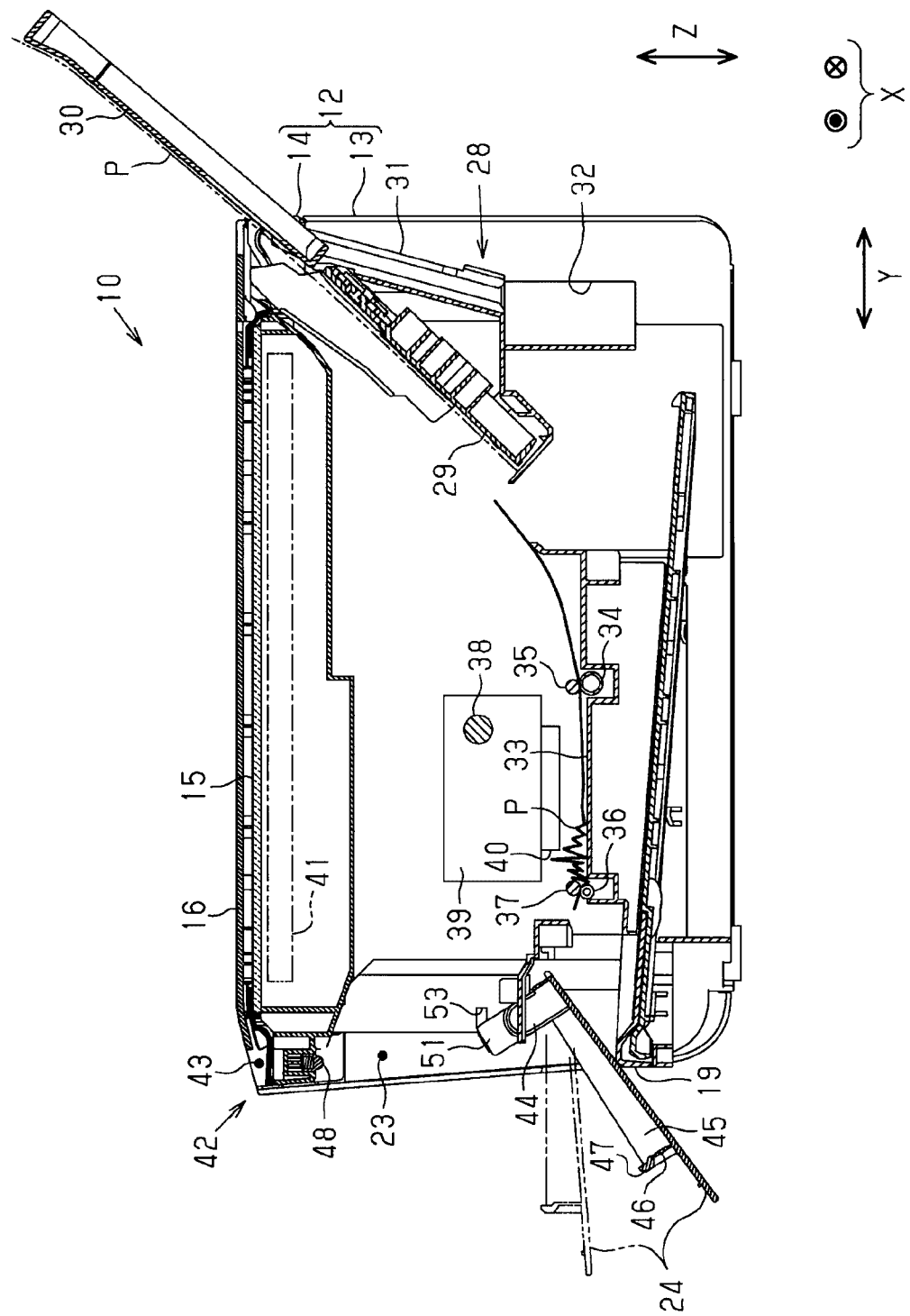
FIG. 12 is a side sectional view schematically illustrating the recording apparatus with the front cover set in a second open state.

As illustrated in FIG. 12, according to need, the front cover 24 can be opened from the first open state indicated by a two-dot chain line to a second open state, in which the front cover 24 is open at a larger opening angle than that in the first open state, indicated by a solid line. For example, during removal of the medium P jammed in the apparatus main body 12, the front cover 24 may be brought into contact with a wrist of the user and obstruct the user. In this case, the user can further pivot the front cover 24 counterclockwise so as to open the front cover 24 to the second open state. In so doing, as illustrated in FIG. 12, the stacker 19 having been pulled forward is pushed back to the original position in the apparatus main body 12. In this state, the front cover 24 is brought into contact, from above, with a distal end portion of the stacker 19. Thus, the front cover 24 is held in the second open state without hitting the installation surface of the recording apparatus 10.

Furthermore, in order to set the document on the document placement surface 15 of the document reader 14 defining the upper surface of the apparatus main body 12, the closed document cover 16 is opened by the user. That is, the closed document cover 16 indicated by a solid line in FIG. 9 is opened as indicated by a two-dot chain line in FIG. 9 about a hinge portion (not illustrated) disposed on a rear end portion of the document cover 16 as the pivot. In so doing, the fingertips of the user are inserted into the hand-holding recess 43 provided at the corner portion 42 in the upper front portion of the apparatus main body 12. That is, the hand-holding recess 43 used to open the front cover 24 is also used to open the document cover 16. The document cover 16 is opened such that the front end portion of the document cover 16 held by the user's hand at the position of the recess 43 is moved clockwise in FIG. 9. As a result, the region above the document placement surface 15 is exposed, thereby allowing the user to place the document on the document placement surface 15.

Furthermore, in order to replenish the liquid containing unit 25 with the liquid, the tank cover 26 is opened from the state illustrated in FIG. 1 to the state illustrated in FIG. 4. In so doing, as illustrated in FIG. 4, the hand-holding recess 43 provided at the corner portion 42 in the upper front portion of the apparatus main body 12 is used. That is, the fingertips of the user are inserted into the recess 43, and the rear end portion of the tank cover 26 held by the user's hand at the position of the recess 43 is pivoted forward so that the tank cover 26 is opened. That is, the hand-holding recess 43 used to open the document cover 16 and used to open the front cover 24 is also used to open the tank cover 26.

According to the embodiment having been described, the following effects can be obtained.

1. The user inserts his/her fingertips into the hand-holding recess 43 when holding with his/her hand the document cover (first opening/closing member) 16 to open the document cover (first opening/closing member) 16 and inserts his/her fingertips into the same hand-holding recess 43 also when holding with his/her hand the front cover (second opening/closing member) 24 to open the front cover 24 (second opening/closing member). That is, it is not necessary to provide a plurality of hand-holding recesses 43 separately at a plurality of positions in the outer surfaces of the apparatus main body 12. Thus, the document cover 16 and the front cover 24 as a plurality of opening/closing members provided in a plurality of surfaces of the apparatus main body 12 can be easily opened without making the external shape of the apparatus main body 12 complex.

2. The hand-holding recess 43 to be used to open the document cover (first opening/closing member) 16 and also used to open the front cover (second opening/closing member) 24 and the operating unit 20 to be operated by the user are adjacent to each other in the upper front portion of the apparatus main body 12. This increases ease of operation of the recording apparatus 10 performed by the user.

3. The liquid can be poured into the liquid containing unit 25 on the front surface side at the front of the apparatus main body 12. This improves work efficiency.

4. For example, in order to pour the liquid from the outside into the liquid containing unit 25, operation to open the closed tank cover (third opening/closing member) 26 can be performed on the front surface side at the front of the apparatus main body 12. Thus, also in this regard, ease of operation of the recording apparatus 10 performed by the user is increased.

5. The user can insert his/her fingertips into the hand-holding recess 43 when holding with his/her hand the document cover (first opening/closing member) 16 to open the document cover 16 (first opening/closing member) and the front cover (second opening/closing member) 24 to open the front cover (second opening/closing member) 24 and insert his/her fingertips into the same hand-holding recess 43 also when holding with his/her hand the tank cover (third opening/closing member) 26 to open the tank cover (third opening/closing member) 26.

6. Part of a space occupied by the liquid containing unit 25 can be provided outside the apparatus main body 12. Thus, the size of the apparatus main body 12 can be reduced while the capacity of the liquid containing unit 25 can be increased.

7. For example, when maintenance is performed in the apparatus main body 12 while the front cover (second opening/closing member) 24 is open, the maintenance may be obstructed with the front cover 24 (second opening/closing member) set in the first open state. In this case, when the front cover (second opening/closing member) 24 is set in the second open state in which the front cover 24 (second opening/closing member) is open at the larger opening angle than that in the first open state, ease of the maintenance is increased.

8. Opening of the front cover (second opening/closing member) 24 from the second open state to the state where the front cover 24 (second opening/closing member) is open at the larger opening angle than that in the second open state can be regulated by the stacker 19 that is to be brought into contact with the front cover 24 (second opening/closing member) from below. This can reduce the likelihood of the front cover (second opening/closing member) 24 being largely opened so as to hit other members.

The embodiment having been described can be changed as follows. Also, the following variations can be appropriately combined when the variations can be combined, thereby making another variation.

Instead of the document cover 16, the first opening/closing member may be defined by a medium transport device that automatically transports the document onto the document placement surface 15.

In the apparatus main body 12, the element that is brought into contact with and holds the front cover 24 (second opening/closing member) from below when the front cover 24 (second opening/closing member) is in the second open state in which the front cover 24 (second opening/closing member) is open at the larger opening angle than that in the first open state is not limited to the stacker 19. For example, the front cover 24 (second opening/closing member) may be brought into contact with a lower edge out of opening edges of the output opening 18.

In addition to the first open state and the second open state, the front cover (second opening/closing member) 24 may be opened further and held in a third open state in which the front cover (second opening/closing member) 24 is opened at a larger opening angle than that in the second open state. Alternatively, the front cover 24 (second opening/closing member) is held only in the first open state other than the closed state.

The liquid containing unit 25 may be provided in, for example, the right surface side instead of the front surface side in the apparatus main body 12. In this case, the liquid containing unit 25 and the tank cover 26 may be disposed at positions not adjacent to the hand-holding recess 43 provided in the upper front portion of the apparatus main body 12.

The document cover (first opening/closing member) 16, the front cover (second opening/closing member) 24, or the tank cover (third opening/closing member) 26 is not necessarily opened/closed by being pivoted. The document cover (first opening/closing member) 16, the front cover (second opening/closing member) 24, and the tank cover (third opening/closing member) 26 may be opened/closed by being slid.

The first surface and the second surface of the apparatus main body 12 may be defined by surfaces other than the upper surface and the front surface. For example, the first surface and the second surface may be defined by the front surface 17 and the right side surface of the housing 13 of the apparatus main body 12. In this case, the first opening/closing member and the second opening/closing member are opened/closed in the front surface 17 and the right side surface of the housing 13, and the hand-holding recess 43 used for both the opening/closing members is provided at a corner portion where the front surface 17 and the right side surface of the housing 13 intersect each other.

The hand-holding recess 43 may be provided at a corner portion where three surfaces of the apparatus main body 12 adjacent to one another (for example, the upper surface, the front surface, and the right side surface) intersect one another, so that, when opening any of three opening/closing members opened/closed in the respective three surfaces, the same recess 43 used for the three opening/closing members is used.

The medium P is not necessarily a sheet of paper. The medium P may be, for example, a plastic film.

Other than the configuration in which the recording head 40 which serves as the recording unit and is supported by the carriage 39 reciprocates together with the carriage 39 along the guide shaft 38 which is provided in the housing 13 and extends in the width direction, the recording apparatus 10 may be a so-called line scan head-type printer in which the recording head 40 is not moved and nozzles are formed in an entire region along the width direction. Alternatively, the recording apparatus 10 may be a laser printer.

The entire disclosure of Japanese Patent Application No. 2017-229578, filed Nov. 29, 2017 is expressly incorporated by reference herein.

What is claimed is:

1. A recording apparatus comprising:
a recording unit that ejects liquid to a medium so as to perform recording;
an apparatus main body that houses the recording unit therein and that has outer surfaces including a first surface and a second surface which is adjacent to the first surface and which intersects the first surface;
a first opening/closing member provided on the first surface of the apparatus main body so as to be able to be opened/closed; and
a second opening/closing member provided on the second surface of the apparatus main body so as to be able to be opened/closed;
wherein a hand-holding recess used to open the first opening/closing member and also used to open the second opening/closing member is positioned at part of a portion of the apparatus main body where the first surface and the second surface intersect each other.

2. The recording apparatus according to claim 1,
wherein the first surface is an upper surface of the apparatus main body when the recording apparatus is installed in a usable state,
wherein the second surface is a front surface serving as a front surface of the apparatus main body, and
wherein the recess is provided adjacent to an operating unit that is provided in an upper front portion of the apparatus main body and that is used to operate the recording apparatus.

3. The recording apparatus according to claim 2,
wherein, in the front surface of the apparatus main body, a liquid containing unit that is able to contain the liquid is provided adjacent to the recess.

4. The recording apparatus according to claim 3,
wherein the liquid containing unit allows the liquid to be poured thereinto from an outside thereof.

5. The recording apparatus according to claim 3,
wherein the liquid containing unit is provided with a third opening/closing member that is, by being operated by a user who holds with his/her hand the third opening/closing member, able to be opened so as to open the liquid containing unit at a top of the liquid containing unit and able to be closed so as to cover the liquid containing unit from above.

6. The recording apparatus according to claim 5,
wherein the third opening/closing member having been closed so as to cover the liquid containing unit from above is, by being held by a hand by using the recess positioned in the upper front portion of the apparatus main body, pivoted forward so as to be opened to open the liquid containing unit at the top of the liquid containing unit.

7. The recording apparatus according to claim 3,
wherein the liquid containing unit projects further forward than the second opening/closing member.

8. The recording apparatus according to claim 1,
wherein, when the second opening/closing member is opened in the second surface, the second opening/closing member is able to be held in a first open state and able to be held in a second open state in which the second opening/closing member is open at a larger opening angle than an opening angle at which the second opening/closing member is open in the first open state.

9. The recording apparatus according to claim 8,
wherein a stacker that allows the medium output from an inside of the apparatus main body to be placed thereon is disposed below the second opening/closing member on a front surface side of the apparatus main body, and
wherein the second opening/closing member is brought into contact with the stacker from above so as to be held in the second open state.

* * * * *